(12) United States Patent
Onlek et al.

(10) Patent No.: US 12,736,703 B2
(45) Date of Patent: Sep. 15, 2026

(54) METAL DETECTOR UTILIZING ASYNCHRONOUS DEMODULATION

(71) Applicant: NOKTA MUHENDISLIK ANONIM SIRKETI, Istanbul (TR)

(72) Inventors: Mehmet Onlek, Istanbul (TR); Levent Tura, Istanbul (TR); Gokhan Bulku, Istanbul (TR)

(73) Assignee: NOKTA MUHENDISLIK ANONIM SIRKETI, Istanbul (TR)

( * ) Notice: Subject to any disclaimer, the term of this patent is extended or adjusted under 35 U.S.C. 154(b) by 177 days.

(21) Appl. No.: 18/850,056

(22) PCT Filed: Dec. 23, 2022

(86) PCT No.: PCT/TR2022/051584
§ 371 (c)(1),
(2) Date: Sep. 24, 2024

(87) PCT Pub. No.: WO2024/107132
PCT Pub. Date: May 23, 2024

(65) Prior Publication Data

US 2025/0208312 A1 Jun. 26, 2025

(30) Foreign Application Priority Data

Nov. 15, 2022 (TR) ................................ 2022/017264

(51) Int. Cl.
*G01V 3/165* (2006.01)

(52) U.S. Cl.
CPC .................................... *G01V 3/165* (2013.01)

(58) Field of Classification Search
CPC ............ G01V 3/165; G01V 3/10; G01V 3/00; H03M 3/458
See application file for complete search history.

(56) References Cited

U.S. PATENT DOCUMENTS 3,746,996 A 7/1973 Peoples
7,579,839 B2 * 8/2009 Candy .................... G01V 3/104 324/228

(Continued)

FOREIGN PATENT DOCUMENTS

CN 109714004 A 5/2019
CN 213023598 U 4/2021
WO WO-2011113581 A1 * 9/2011 ............... G01V 3/10

*Primary Examiner* — Christopher E Mahoney

(74) *Attorney, Agent, or Firm* — Bayramoglu Law Offices LLC

(57) ABSTRACT

A metal detector suitable for detecting a metal target under the ground includes: a transmitter switching circuit for switching the voltage of a transmitter signal, a transmitter coil for emitting the transmitter signal received from the transmitter switching circuit, a receiver coil induced by receiving the magnetic field and for generating a receiving signal of the magnetic field received, a receiver amplifier circuit for amplifying the receiving signal received from the receiver coil, an AD converter for converting the receiving signal and transmitter current from analog to digital, and a control unit connected to the AD converter for receiving the converted transmitter current and receiving signal, having a demodulation unit for obtaining amplitude and phase values, a correction unit for correcting phase differences in the transmitter current and receiver voltage, and a signal processing unit for operating a user interface based on the phase corrected receiving signal.

9 Claims, 1 Drawing Sheet

(56) References Cited

U.S. PATENT DOCUMENTS

| | | | | |
|---|---|---|---|---|
| 2016/0169717 | A1 | 6/2016 | Zhitomirsky | |
| 2022/0342107 | A1* | 10/2022 | Murata .................... | G01V 3/10 |
| 2023/0025566 | A1* | 1/2023 | Wilson .................... | G01V 3/28 |

* cited by examiner

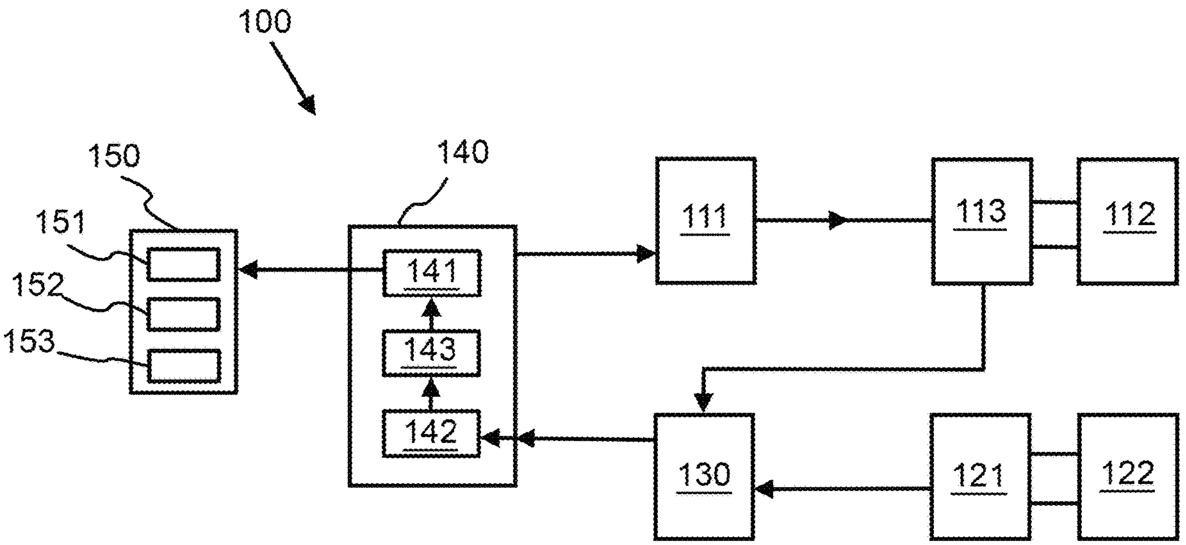
100
150
151
152
153
140
141
143
142
111
113
112
130
121
122

METAL DETECTOR UTILIZING ASYNCHRONOUS DEMODULATION

CROSS REFERENCE TO THE RELATED APPLICATIONS

This application is the national phase entry of International Application No. PCT/TR2022/051584, filed on Dec. 23, 2022, which is based upon and claims priority to Turkish Patent Application No. 2022/017264, filed on Nov. 15, 2022, the entire contents of which are incorporated herein by reference.

TECHNICAL FIELD

The invention relates to metal detectors.

BACKGROUND

Metal detectors include a search head. A scanning signal in form of magnetic field emitted by a transmitter coil provided in the search head changes when it interacts with the metal object. This altered magnetic field, is received by a receiving antenna and converted into a signal. The received signal is demodulated synchronously. Due to the demodulated signal, the change applied by the metal object to the magnetic field can be detected, and information about the metal object can be obtained. Synchronous analog-to-digital converters are required for this demodulation.

As a result of the aforementioned problems, innovation in the relevant technical field has become necessary.

SUMMARY

The present invention relates to a metal detector to eliminate the above-mentioned disadvantage and bring new advantages to the relevant technical field.

An object of the invention to provide a metal detector that detects metal without the need for a synchronous demodulation process.

Another object of the invention is to provide a metal detector that detects metal using different types of analog-to-digital converters.

Another object of the invention is to eliminate the need to synchronize delta-sigma analog-to-digital converters.

In order to realize all the object that will emerge from the abovementioned and the following detailed description, the present invention is a metal detector suitable for detecting a metal target under the ground, comprising a transmitter switching circuit for switching the voltage of a transmitter signal consisting of a series of multi-period rectangular waves; a transmitter coil for emitting the transmitter signal received from the said transmitter switching circuit; a receiver coil for generating a receiving signal related to the magnetic field induced and received by receiving the magnetic field; and a receiver amplifier circuit for amplifying the receiving signal received from the said receiver coil. Accordingly, it comprises an AD converter which is connected to the receiver amplifier circuit which is suitable for receiving the amplified receiving signal and a transmitter voltage adjusting circuit which is suitable for receiving a transmitter current which constitutes the transmitter signal and which is suitable for converting the receiving signal and the transmitter current from analog to digital; a control unit which is connected to the AD converter in such a way as to receive the converted transmitter current and the receiving signal, which has a demodulation unit which is used to obtain the amplitude and phase values by processing the transmitter current and the receiving signal in asynchronous demodulation, which has a correction unit which is used to correct the phase differences between the transmitter current and the receiver voltage due to asynchronous demodulation based on the angular difference, and which has a signal processing unit which serves to operate a user interface according to the phase corrected receiving signal. Thus, the need for synchronous demodulation is eliminated; it is possible to use different types of analog-to-digital converters.

A possible embodiment of the invention is characterized in that the said AD converter is of the sigma-delta type. Thus, such converters can be used and achieve higher performance by eliminating the need for synchronization.

Another possible embodiment of the invention is characterized in that the said signal processing unit, demodulation unit, and correction unit are processors.

Another possible embodiment of the invention is characterized in that the said signal processing unit, demodulation unit, and correction unit are provided as a single processor.

Another possible embodiment of the invention is characterized in that the said user interface comprises an audio warning element.

Another possible embodiment of the invention is characterized in that the said user interface comprises a display.

Another possible embodiment of the invention is characterized in that it comprises a transmitter voltage adjusting circuit that serves to increase the voltage to the determined voltage level before being transmitted to the said transmitter switching circuit. Thus, the recovery of the reactive power is also provided.

BRIEF DESCRIPTION OF THE DRAWINGS

FIGURE illustrates a representative view of the electronic components of the metal detector.

REFERENCE NUMBERS GIVEN IN THE FIGURE

100 Metal detector
111 Transmitter voltage adjusting circuit
112 Transmitter coil
113 Transmitter switching circuit
121 Receiver amplifier circuit
122 Receiver coil
130 AD converter
140 Control unit
141 Signal processing unit
142 Demodulation unit
143 Correction unit
150 User interface
151 Audio warning element
152 Display

DETAILED DESCRIPTION OF THE EMBODIMENTS

In this detailed description, the metal detector of the invention is described only by way of non-limiting examples for a better understanding of the subject matter.

The metal detectors (100) may essentially comprise a search head (not shown), a transport shaft (not shown) with the search head attached, enabling users to carry it, and a user interface (150) provided at the other end of the search head.

Referring to FIGURE, the inventive metal detector (100) further comprises a control unit (140). The control unit (140) generates a transmitter signal for detection. The transmitter signal comprises a series of multi-period rectangular waves. The metal detector (100) comprises a transmitter switching circuit (113) that switches the voltage of the said transmitter signal. The metal detector (100) comprises a transmitter coil (112) that emits the voltage switched transmitter signal. Thus, the transmitter signal used to detect a metal object is emitted in the form of a magnetic field.

The metal detector (100) further comprises a receiver coil (122). The receiver coil (122) is being induced by the magnetic field to which it is exposed, allowing a receiving signal to be generated. The metal detector (100) includes a receiver amplifier circuit (121) that amplifies the receiving signal from the receiver coil (122). As an innovative aspect of the invention, the metal detector (100) comprises a transmitter current forming the switched transmitter signal and an AD converter (130) for converting the receiving signal from analog to digital. The AD converter (130) may be of the sigma-delta type. The AD converter (130) receives asynchronous samples of the receiving signal and the transmitter current. A control unit (140) receives the converted receiving signal and transmitter current from the AD converter (130) as input. A demodulation unit (142) of the control unit (140) performs asynchronous demodulation of the transmitter current and the receiving signal. More specifically, the demodulation unit (142) processes the voltage of the receiving signal. Amplitude and phase values are obtained as a result of asynchronous demodulation. The control unit (140) further includes a correction unit (143). The said correction unit (143) corrects phase differences in transmitter current and receiver voltage due to asynchronous demodulation. A signal processing unit (141) provides target detection according to the phase difference corrected receiving signal and operates the user interface (150) according to this signal.

The signal processing unit (141), the demodulation unit (142), and the correction unit (143) may be processors. The signal processing unit (141), the demodulation unit (142), and the correction unit (143) can be provided in a single processor, i.e., the control unit (140) can be a processor.

The transmitter control unit (140) generates the transmitter signal in a possible embodiment of the invention. In this embodiment, a transmitter voltage adjusting circuit (111) is provided between the control unit (140) and the transmitter switching circuit (113). The transmitter voltage adjusting circuit (111) allows the transmitter signal to be raised to the voltage at predetermined conditions. The transmitter voltage adjusting circuit (111) enables the transmitter signal raised to the appropriate voltage levels to be transmitted to the transmitter switching circuit (113). In this way, some of the reactive power is also recovered.

The user interface (150) comprises an audio warning unit (151) in a possible embodiment of the invention. The user interface (150) comprises a display (152) in a possible embodiment of the invention.

The invention is also a method. It is carried out with the abovementioned components of the metal detector (100), and accordingly, comprises the following steps:

Generating a transmitter signal consisting of a series of multi-period rectangular waves. In this step, the transmitter signal to be used in metal detection is generated by the control unit (140).

Switching the voltage of the transmitter signal. In this step, it is ensured that the signal is made suitable for transmission from the transmitter coil via the transmitter switching circuit (113) comprising the switching circuit elements known in the art.

In a preferred embodiment, the step of increasing the generated transmitter signal to the predetermined voltage level is provided. In this step, the transmitter signal is increased to the appropriate voltage level to be suitable for switching.

Emitting the switched transmitter signal by a transmitter coil (112) in the form of a magnetic field.

Generating a receiving signal related to the magnetic field by a receiver coil. In this step, the transmitter signal is emitted as a magnetic field by the transmitter coil.

Amplifying the receiving signal received from the said receiver coil (122). The transmitter signal, which is spread in the form of a magnetic field, is received by the receiver coil (122) by interacting with the target. A receiving signal is generated by induction caused by the effect of the magnetic field.

The received signal is preferably amplified by a receiver amplifier circuit (121).

Converting the receiving signal from analog to digital. In this step, the voltage of the receiving signal is converted from analog to digital by being sampled asynchronously.

Converting a transmitter current forming the transmitter signal to digital. In this step, a transmitter current forming the transmitter signal is sampled asynchronously and converted to digital.

Obtaining amplitude and phase values by processing the converted transmitter current and the receiving signal, using asynchronous demodulation. With this step, the amplitude and phase values of the transmitter signal current and the receiving signal voltage are obtained by asynchronous demodulation without the need for synchronous demodulation. The phase of the transmitter signal current and the receiving signal voltage are received asynchronously. The phase error that will occur due to the synchronization difference is very close for both of them. When the difference between the receiving signal voltage and the individual phases of the transmitter signal current is calculated, the error decreases to a level that can be ignored.

Correcting phase differences in transmitter current and receiver voltage, which occur due to asynchronous modulation, based on angular difference.

Presentation of the signals related to metal detection according to the phase-corrected receiving signal to the user in the user interface (141). In this step, the signal output for target finding is given through the phase-corrected receiving signal. When the transmitter signal interacts with metal, it adds information into the signal, to which the transmitter signal serves as a carrier and thus modifies the receiving signal. Due to the asynchronous demodulation described above, this information can be extracted and presented to the user through the user interface.

The protection scope of the invention is specified in the attached claims and cannot be limited to those explained for sampling purposes in this detailed description. It is evident that those skilled in the art may exhibit similar embodiments in light of the above-mentioned facts without drifting apart from the main concept of the invention.

What is claimed is:

1. A metal detector for detecting a metal target under ground, comprising:

a transmitter switching circuit configured to switch a voltage of a transmitter signal consisting of a series of multi-period rectangular waves;

a transmitter coil configured to emit the transmitter signal received from the transmitter switching circuit;

a receiver coil induced by receiving a magnetic field and configured for generating a receiving signal of the magnetic field received;

a receiver amplifier circuit for amplifying the receiving signal received from the receiver coil to obtain an amplified receiving signal;

an AD converter for converting the amplified receiving signal and a transmitter current from analog to digital, wherein the AD converter is connected to the receiver amplifier circuit for receiving the amplified receiving signal and to a transmitter voltage adjusting circuit for receiving the transmitter current generating the transmitter signal, and the AD converter is connected to the transmitter voltage adjusting circuit to receive a transmitter signal current;

a control unit connected to the AD converter for receiving the transmitter current and the receiving signal converted to digital, wherein the control unit comprises a demodulation unit configured for obtaining amplitude and phase values by processing the transmitter current and the receiving signal using asynchronous demodulation process, a correction unit configured for correcting phase differences in the transmitter current and a receiver voltage due to asynchronous demodulation, and a signal processing unit for operating a user interface based on a phase corrected receiving signal.

2. The metal detector according to claim 1, wherein the AD converter is of a sigma-delta type.

3. The metal detector according to claim 1, wherein the signal processing unit, the demodulation unit, and the correction unit are processors.

4. The metal detector according to claim 1, wherein the signal processing unit, the demodulation unit, and the correction unit are provided as a single processor.

5. The metal detector according to claim 1, wherein the user interface comprises an audio warning element.

6. The metal detector according to claim 1, wherein the user interface comprises a display.

7. The metal detector according to claim 1, further comprising: a transmitter voltage adjusting circuit for increasing the voltage to a determined level before the voltage is transmitted to the transmitter switching circuit.

8. A method implemented by a metal detector, comprising steps of generating a transmitter signal consisting of a series of multi-period rectangular waves, switching a voltage of the transmitter signal to obtain a switched transmitter signal, emitting the switched transmitter signal by a transmitter coil in a form of a magnetic field, generating a receiving signal related to the magnetic field by a receiver coil, amplifying the receiving signal received from the receiver coil, converting the receiving signal from analog to digital, converting a transmitter current forming the transmitter signal to digital to obtain a converted transmitter current, obtaining amplitude and phase values by processing the converted transmitter current and the receiving signal using asynchronous demodulation, correcting phase differences in the transmitter current and a receiver voltage to obtain a phase-corrected receiving signal, wherein the phase differences occur due to asynchronous modulation, based on angular difference, and presenting signals related to metal detection according to the phase-corrected receiving signal to a user in the user interface.

9. The method according to claim 8, further comprising: increasing the transmitter signal to a predetermined voltage level.

* * * * *